United States Patent
Takahashi (10) Patent No.: US 6,275,700 B1
(45) Date of Patent: Aug. 14, 2001

(54) INCOMING CELL CONTROL METHOD AND DEVICE FOR MOBILE COMMUNICATION DEVICE

(75) Inventor: Shinya Takahashi, Hino (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/230,512

(22) PCT Filed: May 26, 1998

(86) PCT No.: PCT/JP98/02299

§ 371 Date: Jan. 26, 1999

§ 102(e) Date: Jan. 26, 1999

(30) Foreign Application Priority Data

May 26, 1997 (JP) .................................................. 9-135191

(51) Int. Cl.[7] .................................................. H04Q 7/20
(52) U.S. Cl. ........................................... 455/434; 455/567
(58) Field of Search ................................... 455/434, 458, 455/567, 31.2, 31.3, 38.1

(56) References Cited

U.S. PATENT DOCUMENTS

| | | | |
|---|---|---|---|
| 4,486,624 | * 12/1984 | Puhl et al. | 455/550 X |
| 5,119,502 | * 6/1992 | Kallin et al. | 455/458 |
| 5,239,572 | * 8/1993 | Saegusa et al. | 455/458 |
| 5,819,174 | * 10/1998 | Kyllonen | 455/414 |
| 5,826,173 | * 10/1998 | Dent | 455/38.3 |
| 5,963,846 | * 10/1999 | Kurby | 455/12.1 |
| 6,108,543 | * 8/2000 | Takahashi et al. | 455/434 |

FOREIGN PATENT DOCUMENTS

| | | |
|---|---|---|
| 7-222251 | 8/1995 | (JP) . |
| 7-312782 | 11/1995 | (JP) . |

OTHER PUBLICATIONS

"Second-generation Cordless Telephone System Standards Second Edition" p.508–509.
International Search Report; Application No. PCT/JP98/02299; Aug. 17, 1998.

* cited by examiner

Primary Examiner—Nay Maung
(74) Attorney, Agent, or Firm—Banner & Witcoff, Ltd.

(57) ABSTRACT

An incoming call control method and device for a mobile communication device, can respond to an incoming call swiftly, even in cases where there has been a failure in a response to an incoming call signal from a base station. In a mobile communication device which selects a control channel by scanning control channels for transmitting and receiving control signals to and from a base station, assumes a standby state awaiting an incoming call signal transmitted by a base station using the control channel thus selected, and establishes a communication channel with the base station by making incoming call response to an incoming call signal when an incoming call signal is received from a base station in the standby state. The mobile communication device returns to the standby state without carrying out scanning for a new control channel when the incoming call response to an incoming call signal from the base station has failed.

12 Claims, 6 Drawing Sheets

INCOMING CELL CONTROL METHOD AND DEVICE FOR MOBILE COMMUNICATION DEVICE

TECHNICAL FIELD

This invention relates to an incoming call control method and device in a mobile communication device for carrying out communication by radio between a base station and a mobile device, and more particularly, to an incoming call control method and device for a mobile communication device which is improved in such a manner that it is capable of responding to incoming calls swiftly even in cases where it has failed to respond to an incoming call signal from the base station.

BACKGROUND ART

In general, mobile communication devices of this kind (hereinafter, simply called mobile devices) are constituted such that:

1) When the power supply is turned on, the mobile device scans control channels, and selects the control channel having the greatest field strength as the control channel by which it is to transmit and receive control signals to and from a base station (P-CH scan).
2) When a control channel has been selected, the mobile device receives control data transmitted by the base station using the selected control channel so as to be ready for calling operation by the mobile device or receiving an incoming call signal from the base station (standby state).
3) When the mobile device receives an incoming call signal from the base station during the standby state, it responds to this incoming call signal by transmitting an incoming call response signal to the base station.
4) The mobile device receives a communication channel designation signal transmitted by the base station in response to this incoming call response signal, and switches to a communication channel designated by the communication channel designation signal.

Conventional communication systems using mobile devices of this kind are constituted in such a manner that an incoming call signal is transmitted from a base station to a mobile device, and if, for some reason or other, the base station cannot receive the incoming call response signal transmitted by the mobile device in response to this incoming call signal, then the incoming call signal is retransmitted from the base station to the mobile device.

The time interval from the base station transmitting a first incoming call signal until it retransmits the signal, in other words, until it transmits a second incoming call signal because an incoming call response signal from the mobile device cannot be received, is set to approximately 6 seconds, for example.

This interval is determined by taking into account the tolerable waiting time for the party originating the call and the time required for the mobile device to transmit an incoming call response signal after receiving an incoming call signal, and the like. If this time interval is too short, it will not allow sufficient time for dispatch of the incoming call response signal by the mobile device, while if it is too long, the waiting time for the calling party will become long, which is undesirable.

The mobile device is constituted such that if it has transmitted an incoming call response signal to the base station, but does not receive a communication channel designation signal from the base station within a prescribed period of time, then the mobile device regards the transmission of the incoming call response signal as having failed, and it carries out a further P-CH scan, whereby it scans the control channels again and selects the control channel having the strongest electric field as the control channel for transmitting and receiving control signals to and from the base station.

The prescribed time period by which it is judged that no communication channel designation signal has been received from the base station if the prescribed time period has passed after the mobile device has transmitted an incoming call response signal. This prescribed time period used here is set, for example, to approximately 5 seconds.

This time period from transmission of an incoming call response signal by the mobile device until it is judged that the transmission of the incoming call response signal has failed from the fact that no communication channel designation signal has been received, is determined on the basis of the time period required by the base station to transmit a communication channel designation signal after it has received an incoming call response signal. If this time period is too short, it will not allow sufficient time for transmission of the communication channel designation signal by the base station, while if it is too long, the device will wait needlessly for a communication channel designation signal which cannot be received. Especially, in a situation where the mobile device is waiting to receive this communication channel designation signal using a control channel which is being shared with another mobile device, the aforementioned time period cannot be made too long from the viewpoint of efficient use of the radio channels.

Therefore, at the time that the second incoming call signal transmitted by the base station reaches the mobile device, the mobile device may have transferred to carrying out of a P-CH scan, which scans control channels and selects the control channel having the greatest field strength as a control channel for transmitting and receiving control signal to and from the base station, because it considered the transmission of the incoming call response signal to have failed. If this transferring to P-CH scan takes place, a problem may arise in that the mobile device will not be able to receive the second incoming call signal transmitted by the base station.

Figure 6:
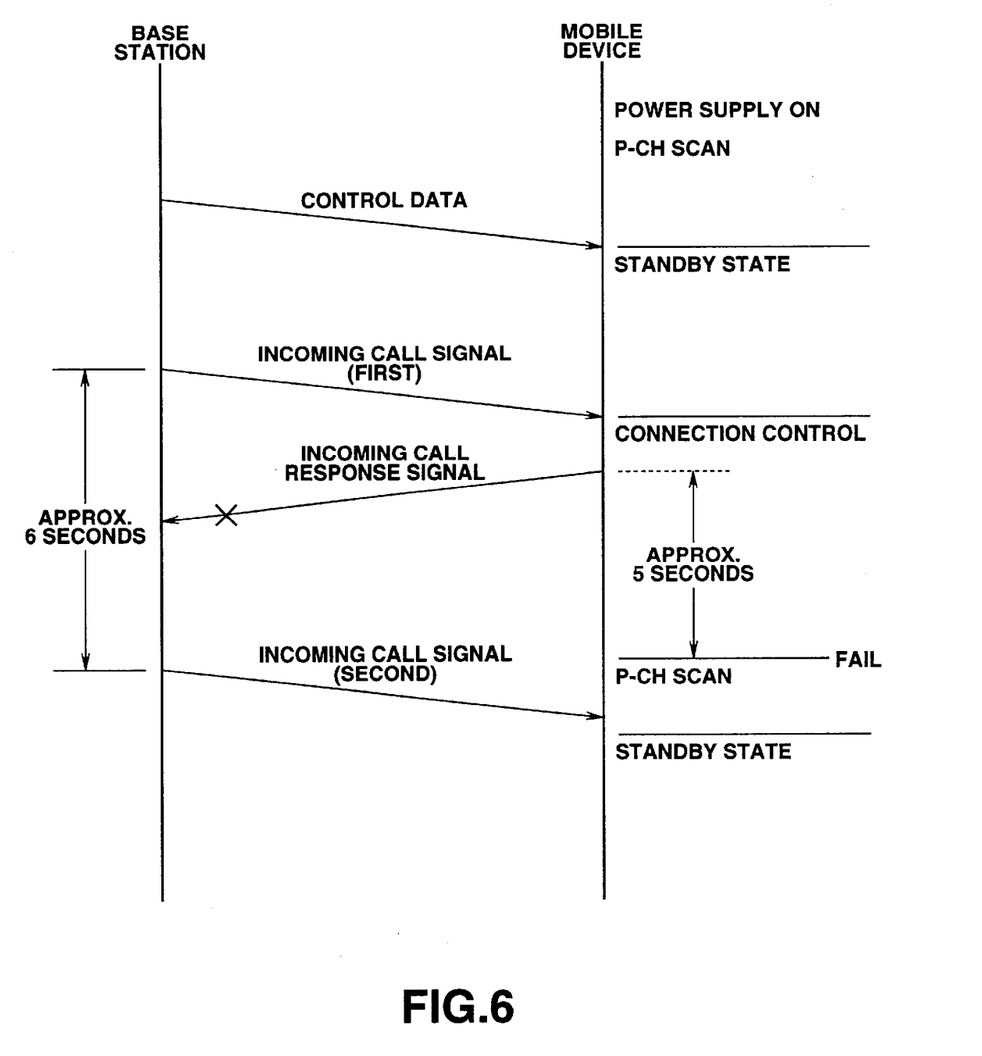
FIG. 6 is a sequence chart illustrating conventional transmission and reception of control signals between a base station and a mobile device in a case where the base station has failed to receive an incoming call response signal from a mobile device and a second incoming call signal is transmitted from the base station to the mobile device.

FIG. 6 gives an illustration, in the form of a sequence chart, of transmission and reception of control signals between a base station and a mobile device in a case where the aforementioned problem occurs.

When the power supply is turned on (Power Supply ON), the mobile device scans the control channels and selects the control channel having the greatest field strength as a control channel to use for transmitting and receiving control signal with a base station (P-CH Scan).

Thereupon, when the mobile device has received control signal from the base station by means of the control channel selected as described above, it assumes a standby state where it awaits a calling operation by the mobile device or an incoming call signal from the base station.

If the mobile device receives a (first) incoming call signal from the base station in this standby state, it assumes a connection control state where a communication channel is established between the mobile device and the base station.

In this connection control operation, firstly, an incoming call response signal is transmitted by the mobile device to the base station.

However, if the base station cannot normally receive the incoming call response signal, then the base station transmits a further (second) incoming call signal to the mobile device, approximately 6 seconds after sending the (first) incoming call signal.

On the other hand, if the mobile device has transmitted an incoming call response signal, but has not received a communication channel designation signal from the base station within approximately 5 seconds, then it regards the transmission of the incoming call response signal to have failed, and carries out a P-CH scan once again by scanning the control channels and selecting the control channel having the greatest field strength as a control channel for transmitting and receiving control signal with the base station.

In the case illustrated in FIG. 6, since the incoming call response signal from the mobile device has not been received normally at the base station, the mobile device transfers to a P-CH scan approximately 5 seconds after sending the incoming call response signal, and the second incoming call signal from the base station reaches the mobile device while it is engaged in the P-CH scan. In this case, the mobile device is not able to receive the (second) incoming call signal from the base station, and therefore cannot respond to the (second) incoming call signal.

Consequently, the mobile device will not be able to respond to the incoming call in spite of the fact that the base station has transmitted a (second) incoming call signal.

In this way, in the conventional mobile device, in cases where the base station transmits a first incoming call signal to the mobile device, and the base station cannot receive an incoming call response signal sent by the mobile device in response to the incoming call signal for a reason of any kind, and the base station therefore transmits a second incoming call signal to the mobile device, a problem may arise in that, at the point in time that this second incoming call signal reaches the mobile device, the mobile device may have transferred to a P-CH scan, namely, a P-CH scan whereby, having considered the transmission of the incoming call response signal to have failed, the mobile device scans the control channels once again and selects the control channel having the greatest field strength as a control channel for transmitting and receiving control signal with the base station. Consequently the mobile device will not be able to receive the second incoming call signal transmitted by the base station.

SUMMARY OF THE INVENTION

Therefore, it is an object of the present invention to provide an incoming call control method and device for a mobile communication device, which are improved in such a manner that the mobile communication device can respond to an incoming call swiftly, even in cases where there has been a failure in a response to an incoming call signal from the base station.

In order to achieve the aforementioned object, an incoming call control method is provided for a mobile communication device which selects a control channel by scanning control channels for transmitting and receiving control signals to and from a base station, assumes in a standby state awaiting an incoming call signal which will be transmitted from the base station using the control channel thus selected, and, when an incoming call signal is received from the base station in the standby state, establishes a communication channel with the base station by making incoming call response to the incoming call signal, where in the mobile communication device returns to the standby state if the incoming call response to the incoming call signal from the base station has failed.

In one respect of the invention, when an incoming call signal is received from the base station in the standby state, the mobile communication device selects a new control channel by rescanning the control channels, and makes incoming call response to the incoming call signal transmitted by the base station by using the control channel thus selected.

In another aspect of the invention, if no incoming call signal has been received from the base station even after a prescribed period of time has elapsed in the standby state, the mobile communication device selects a new control channel by rescanning the control channels, and assumes a standby state awaiting an incoming call signal which will be transmitted from the base station using the control channel thus selected.

According to an aspect of the invention, is an incoming call control device is provided for a mobile communication device which selects a control channel by scanning control channels for transmitting and receiving control signals to and from a base station, assumes a standby state awaiting an incoming call signal which will be transmitted from the base station using the control channel thus selected, and, when an incoming call signal is received from the base station in the standby state, makes incoming call response to the incoming call signal, thereby to establish a communication channel with the base station on the basis of a communication channel designation signal transmitted from the base station, wherein the incoming call control device comprises incoming call responding means for transmitting an incoming call response signal to the base station in response to receiving an incoming call signal from the base station; incoming call response failure detecting means for detecting that incoming call response has failed if no communication channel designation signal is received from the base station despite the fact that an incoming call response signal has been transmitted to the base station by the incoming call responding means; and control means for returning the mobile communication device to the standby state without carrying out scanning for a new control channel when it is detected by the incoming call response failure detecting means that incoming call response has failed.

In another aspect of the invention, the incoming call responding means selects a new control channel by rescanning the control channels and transmits an incoming call response signal to the base station using the control channel thus selected when an incoming call signal is received from the base station in the standby state.

In still another aspect of the invention, the control means selects a new control channel by rescanning the control channels and sets the mobile communication device to a standby state awaiting an incoming call signal transmitted by the base station using the control channel thus selected if no incoming call signal is received from the base station even after a prescribed period of time has elapsed in the standby state.

According to another aspect of the invention, is a mobile communication device which is provided selects a control channel by scanning control channels for transmitting and receiving control signals to and from a base station, assumes a standby state awaiting an incoming call signal which will be transmitted from the base station using the control channel thus selected, and, when an incoming call signal is received from the base station in the. standby state, makes incoming call response to the incoming call signal, thereby to establish a communication channel with the base station on the basis of a communication channel designation signal transmitted from the base station, characterized in that the mobile communication device comprises incoming call responding means for transmitting an incoming call response signal to the base station in response to receiving an incoming call signal from the base station; incoming call response failure detecting means for detecting that incoming call response has failed if no communication channel designation signal is received from the base station despite the fact that an incoming call response signal has been transmitted to the base station by the incoming call responding means; and control means for returning the mobile communication device to the standby state without carrying out scanning for a new control channel when it is detected by the incoming call response failure detecting means that incoming call response has failed.

In another aspect of the invention, the incoming call responding means selects a new control channel by rescanning the control channels and transmits an incoming call response signal to the base station using the control channel thus selected when an incoming call signal is received from the base station in the standby state.

According to another aspect of the invention, the control means selects a new control channel by rescanning the control channels and sets the mobile communication device to a standby state awaiting an incoming call signal transmitted by the base station using the control channel thus selected if no incoming call signal is received from the base station even after a prescribed period of time has elapsed in the standby state.

BEST MODE FOR CARRYING OUT THE INVENTION

Embodiments of the incoming call control method and device for a mobile communication device according to the present invention are described below in detail.

Figure 1:
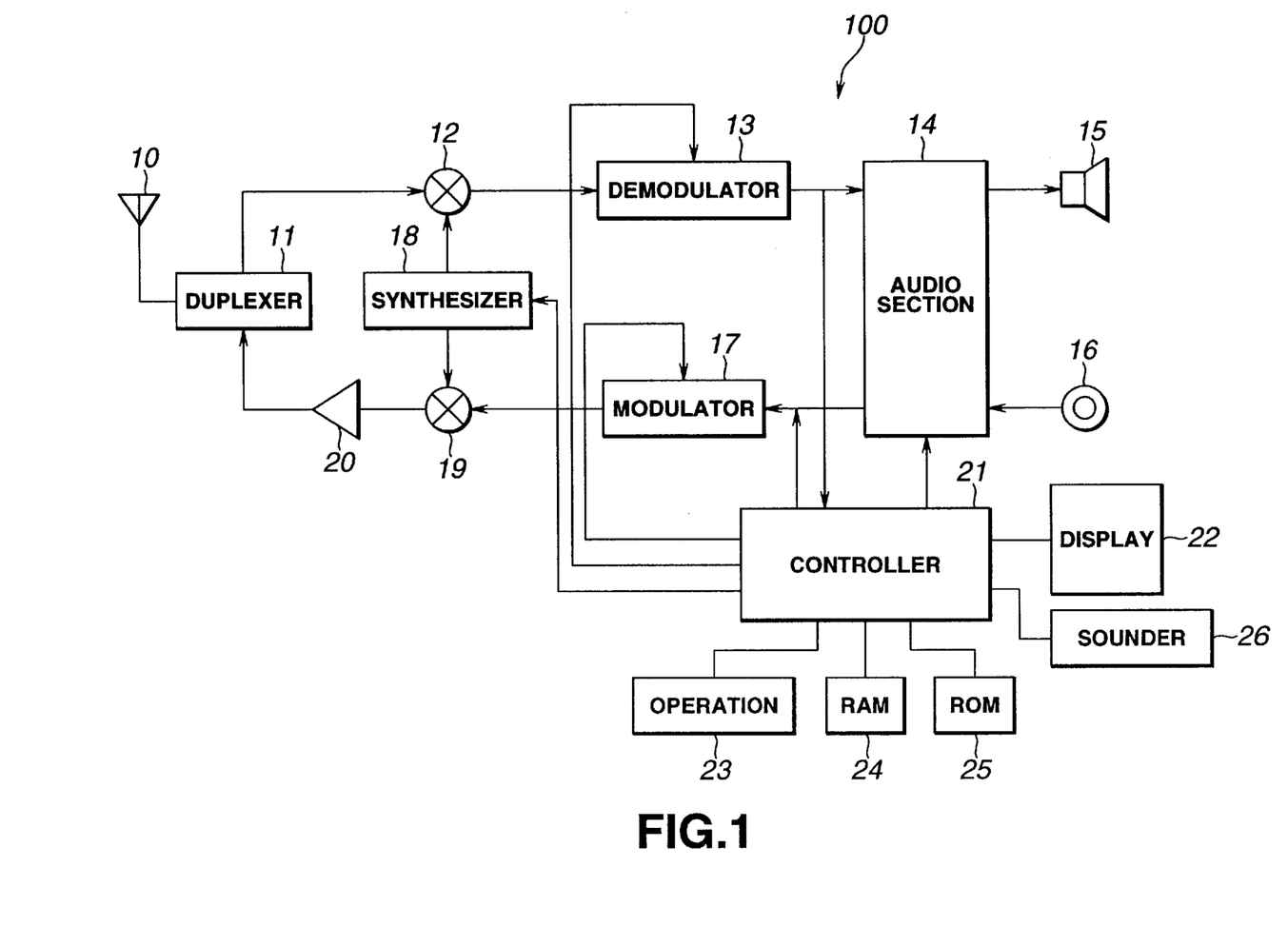
FIG. 1 is a block diagram showing a general configuration of a mobile device constituted by applying the incoming call control method and device for a mobile communication device according to the present invention.

FIG. 1 is a block diagram showing the general configuration of a mobile device constituted by applying the incoming call control method and device for a mobile communication device according to this invention.

Figure 2:
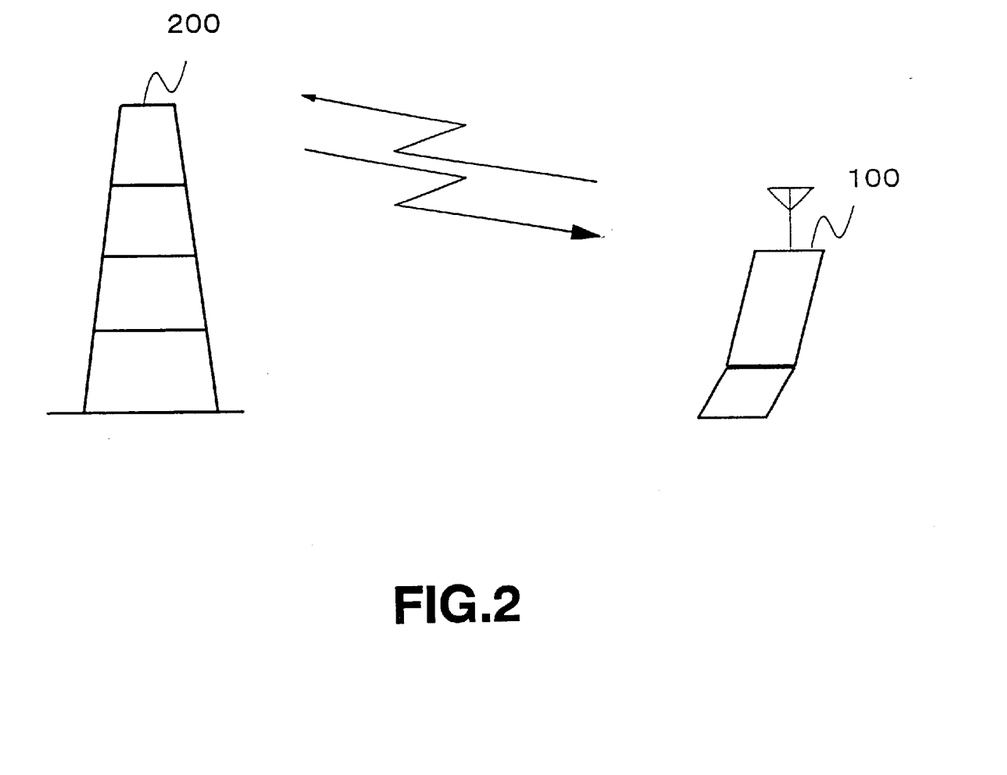
FIG. 2 is a diagram illustrating a state in which radio communication is conducted between the mobile device shown in FIG. 1 and a base station.

In FIG. 1, the mobile device 100 conducts communication with a base station 200 by establishing a radio channel as illustrated in FIG. 2, and it comprises an antenna 10 for transmitting and receiving radio signals with a base station 200 as illustrated in FIG. 2; a duplexer 11 for outputting a radio signal received via the antenna 10 to a mixer 12 and also supplying output from an amplifier 20 to the antenna 10; a mixer 12 for mixing a frequency signal corresponding to a reception channel output by a synthesizer with the radio signal input from the duplexer 11 and converting them to a base band signal; a demodulator section 13 for demodulator the output from the mixer 12; an audio section 14 for converting the reception signal demodulated by the demodulator section 13 to a sound signal and outputting it to a speaker 15 while also converting a sound signal input via a microphone 16 to a transmission signal and outputting it to a modulator section 17; a speaker 15 forming a telephone receiver; a microphone 16 forming a telephone transmitter; a modulator section 17 for modulating the transmission signal output from the audio section 14; a mixer 19 for mixing the output of the modulator section 17 and a frequency signal corresponding to a transmission channel output by the synthesizer 18 and converting them to a radio signal; an amplifier 20 for amplifying the output of the mixer 19; a controller section 21 constituted by a CPU or the like, for controlling the demodulator section 13, audio section 14, modulator section 17, synthesizer 18 and the like; a display section 22 constituted by an LCD or the like and connected to the controller section 21, for displaying data of various kinds; an operation section 23 connected to the controller section 21, for carrying out dialling input and the like; a random access memory (RAM) 24 connected to the controller section 21, which serves as a work area for the controller section 21; a read-only memory (ROM) 25 connected to the controller section 21, for storing control programs for the controller section 21 and the like; and a sounder 26 connected to the controller section 21, for generating a ringing tone.

When the power supply to this mobile device 100 is turned on by means of a power supply switch, which is not shown in the drawings, firstly, the controller section 21 controls the synthesizer 18 and it conducts a P-CH scan by scanning control channels connected to the base station 200 shown in FIG. 2 and, for example, selecting and acquiring the control channel having the greatest field strength.

The mobile device 100 receives control data from the base station 200 by means of the control channel acquired by the P-CH scan, and it is switched to a standby state.

When the mobile device 100 has been switched to a standby state, if it receives an incoming call signal from the base station 200, this incoming call signal is input to the controller section via the antenna 10, duplexer 11, mixer 12 and demodulator section 13.

When the controller section detects reception of an incoming call signal from the base station 200, it creates an incoming call response signal and transmits this incoming call response signal to the base station 200 via the demodulator section 17, mixer 19, amplifier 20, duplexer 11, and antenna 10.

Upon receiving an incoming call response signal from the mobile device 100, the base station 200 transmits a communication channel designation signal designating the communication channel to be used for the call to the mobile device 100.

Upon receiving this communication channel designation signal from the base station 200, the mobile device 100 inputs the communication channel designation signal to the controller section, via the antenna 10, duplexer 11, mixer 12, and demodulator section 13, the controller section 21 controls the synthesizer 18 on the basis of the communication channel designation signal, and a communication channel is established between the mobile device 100 and the base station 200.

Thereupon, the mobile device 100 receives a ringing signal transmitted by the base station 200, and this ringing signal is input to the controller section via the antenna 10, duplexer 11, mixer 12, and demodulator section 13, whereupon the controller section 21 responds to detection of this ringing signal by generating a ringing tone from the sounder 26.

Thereupon, when an off-hook operation is performed by means of the operation section 23 in response to this ringing tone, an off-hook signal is transmitted to the base station 200 via the controller section 21, modulator section 17, mixer 19, amplifier 20, duplexer 11, and antenna 10, thereby establishing a communication state for conducting communication between the mobile device 100 and another party via the base station 200.

In this communication state, a radio signal received from the base station 200 is supplied via the antenna 10, duplexer 11, mixer 12, demodulator section 13 and audio section 14 to the speaker 15, where it is output as sound.

A sound signal input via the microphone 16 is transmitted via the audio section 14, modulator section 17, mixer 19, amplifier 20, duplexer 11 and antenna 10 to the base station 200, in the form of a radio signal.

The foregoing description relates to a case where the mobile device 100 receives an incoming call signal from the base station 200, but in cases where the mobile device 200 originates a call, firstly, an off-hook operation is performed by means of the operation section 23 and a communication channel is then established between the mobile device 100 and the base station under the control of the controller section 21, whereupon connection with another party is established via the base station by means of a dial input relating to the other party made via the operation section 23, and the mobile device 100 then enters a communication state with the other party.

The operation after a communication state has been assumed is the same as in cases where the mobile device 100 receives an incoming call signal from the base station 200.

In the communication state, if an off-hook operation is made at the other party connected via the base station or at the operation section 23 of the mobile device 100, then the communication channel between the base station 200 and the mobile device 100 is disconnected and the mobile device 100 returns to a standby state.

Figure 3:
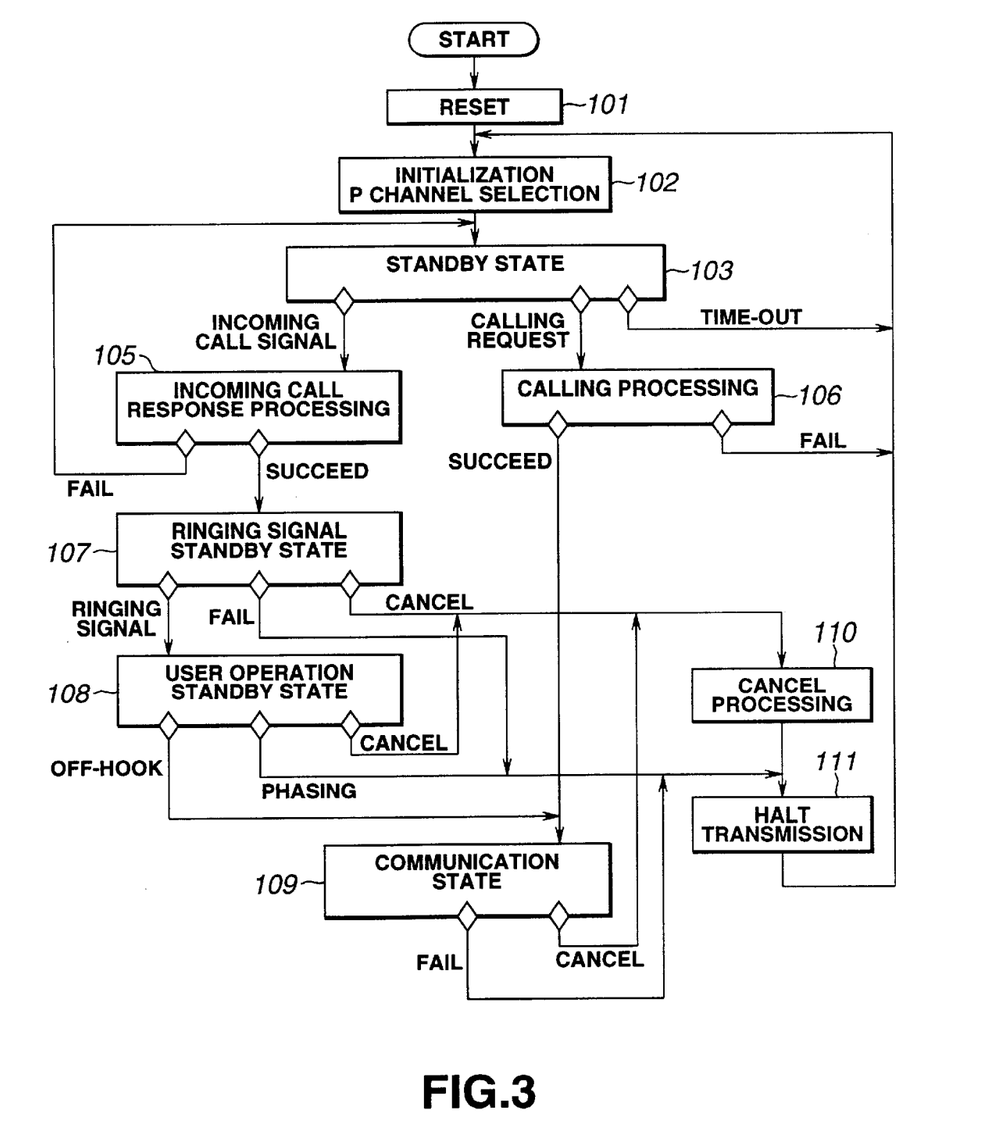
FIG. 3 is a flow chart illustrating the operation of a controller section of the mobile device shown in FIG. 1.

FIG. 3 illustrates the operation of the controller section 21 of the mobile device 100 shown in FIG. 1, in the form of a flow chart.

When the power supply of the mobile device 100 is turned on, firstly, reset processing is carried out for each section of the mobile device (step 101), whereupon all the sections of the mobile device are initialized and P channel selection processing is carried out by scanning the control channels and selecting the control channel having the greatest field strength as the control channel between the mobile device 100 and the base station 200 (step 102).

Thereupon, the mobile device 100 enters a standby state where it awaits a calling operation at the mobile device 100 or an incoming call signal from the base station 200 (step 103), while acquiring the control channel selected by the aforementioned P channel selection processing.

In this standby state, the passage of a prescribed time period is monitored by means of a timer, which is omitted from the drawings, and when this timer performs a time-out, the procedure returns to step 102, and the aforementioned processing is repeating by carrying out initialization and P channel selection processing once again.

In this standby state, if an incoming call signal is received from the base station 200, then incoming call response processing is implemented for making incoming call response to the base station 200 (step 105).

The details of this incoming call response processing are described later with reference to the flow chart shown in FIG. 4.

In the incoming call response processing (step 105), if the incoming call response to the base station 200 fails, then the procedure returns to step 103 and the mobile device 100 assumes a standby state. In other words, it assumes a standby state where it awaits a calling operation in the mobile device 100 or an incoming call signal from the base station 200, while acquiring the control channel selected by the P channel selection processing in step 102.

In the incoming call response processing (step 105), if an incoming call signal to the base station 200 succeeds, then the mobile device 100 switches to a communication channel as designated by a communication channel designation signal transmitted by the base station and it enters a ringing signal standby state where it awaits a ringing signal from the base station 200 in the communication channel to which it has switched (step 107).

In the ringing signal standby state (step 107), if the mobile device 100 receives a ringing signal from the base station 200, then it assumes a user operation standby state where it awaits an off-hook operation by the user (step 108), and if the user performs an off-hook operation at this stage, then the mobile device 100 enters a communication state with the base station 200 (step 109).

In either the ringing signal standby state (step 107), the user operation standby state (step 108) or the communication state (step 109), if a cancel operation is performed, then prescribed canceling processing is implemented (step 110), transmission to the base station 200 in the communication channel is halted (step 111), and the sequence returns to step 102.

Furthermore, in the ringing signal standby state (step 107), the user operation standby state or a case where reception of a ringing signal has failed (step 108), or the communication state or a case where phasing has been detected (step 109), if there is a failure in communication, then transmission to the base station 200 in the communication channel is halted immediately (step 111), and the sequence returns to step 102.

Moreover, in the standby state (step 103), if a calling request is generated by a calling operation made by the user, then prescribed calling processing is carried out (step 106), and if this calling processing is successful, then the mobile device 100 enters a communication state with the base station 200 (step 109), whereas if it fails, then the sequence returns to step 102.

Figure 4:
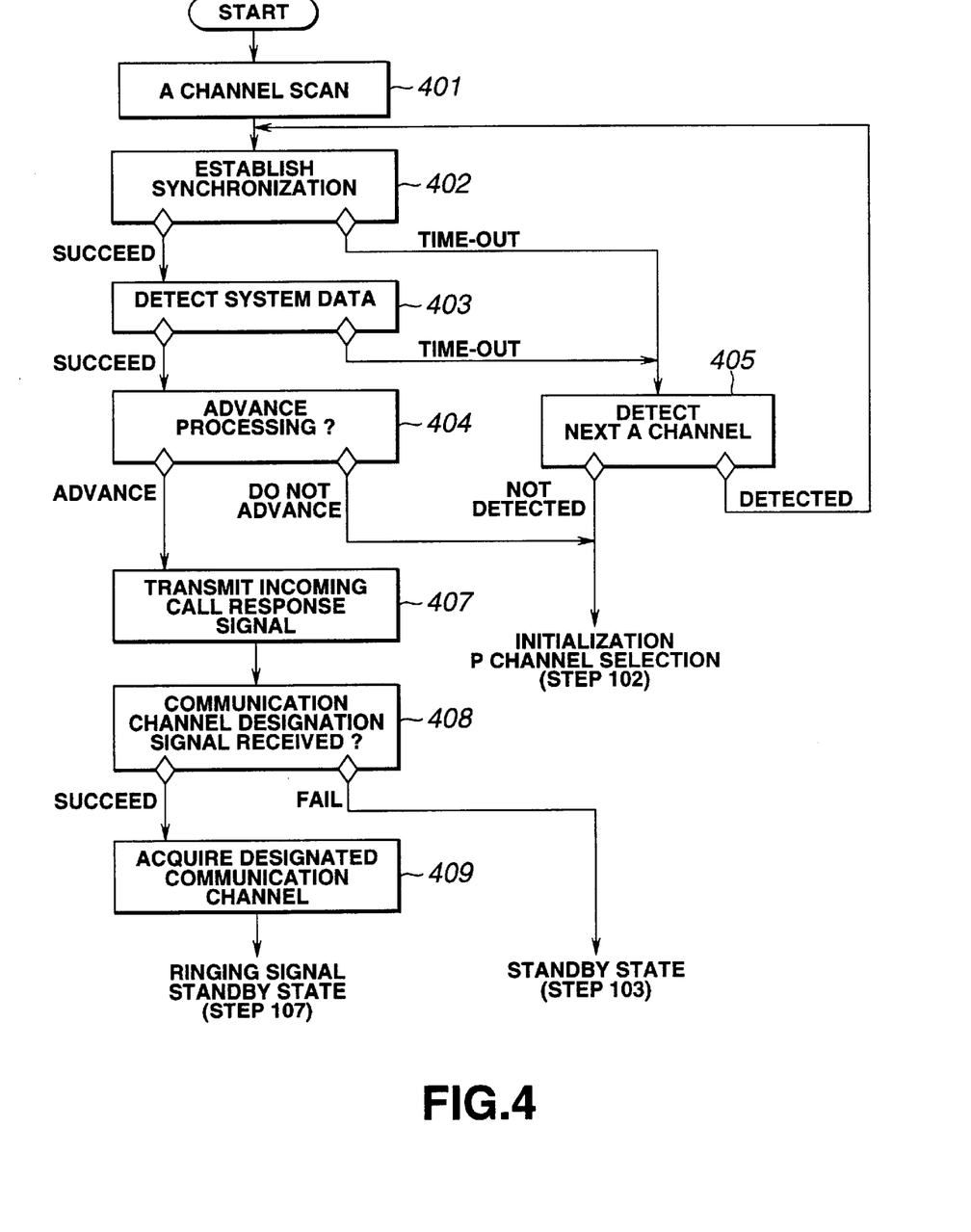
FIG. 4 is a flow chart illustrating a detail of the incoming call response processing shown in FIG. 3.

FIG. 4 illustrates the details of incoming call response processing in step 105 in FIG. 3, in the form of a flow chart.

In the incoming call response processing, firstly, an A channel scan for scanning the control channels between the mobile device 100 and the base station 200 is carried out (step 401). Here, the reason for carrying out this A channel scan for scanning the control channels between the mobile device 100 and the base station 200 is due to the possibility that the mobile device 100 may have moved from its state when the control channel was selected by the P channel selection processing in step 102 in FIG. 3, and hence the radio conditions may have changed.

Next, a synchronization establishing operation is carried out between the mobile device 100 and the base station 200 using the control channel acquired by the A channel scan (step 402), and system data from the base station 200 is detected (step 403).

In the event of a time-out during the synchronization establishing operation in step 402, in other words, if a prescribed period of time has elapsed and synchronization has not been established, or in the event of a time-out during system data detection in step 403, in other words, if a prescribed period of time has elapsed and system data has not been detected, then a subsequent A channel (control channel) is detected (step 405), and when it has been detected, the sequence returns to step 402 and a synchronization establishing operation is carried out using the subsequent A channel (control channel) thus detected.

After the system data detection at step 403, if the system data is detected successfully, then it is investigated whether or not to advance processing to the next step (step 404), and if processing is to be advanced, then the mobile device 100 transmits an incoming call response signal to the base station 200 (step 407), and it then investigates whether a communication channel designation signal has been received from the base station 200 (step 408).

Here, if a communication channel designation signal is successfully received from the base station 200, for example, if a communication channel designation signal is received correctly from the base station 200 within a prescribed time period (approximately 5 seconds) from the transmission of the incoming call response signal at step 407, then the mobile device 100 occupies the communication channel designated by the communication channel designation signal thus received (step 409), and it then enters a ringing signal standby state (step 107) as illustrated in FIG. 3.

If, at step 408, the mobile device 100 has failed to receive a communication channel designation signal from the base station 200, for example, if it has not been able to receive a communication channel designation signal from the base station 200 correctly within a prescribed time period (approximately 5 seconds) after transmitting the incoming call response signal at step 407, then the mobile device 100 returns to the standby state (step 103) shown in FIG. 3, and assumes a standby state where it awaits a calling operation at the mobile device 100 or an incoming call signal from the base station 200, while acquiring the control channel selected by the P channel selection processing in step 102 in FIG. 3.

If, at step 404, it is determined not to advance processing, or if it has not been possible to detect a subsequent A channel (control channel) at step 405 (Not Detected), then the sequence returns to step 102 in FIG. 3 and initialization processing and P channel selection processing are carried out.

In this way, by means of this embodiment, in cases where there has been a failure in incoming call response processing with respect to an incoming call signal from the base station 200, specifically, where the mobile device 100 has received an incoming call signal from the base station 200 but has not received a communication channel designation signal from the base station 200 correctly within a prescribed time period (approximately 5 seconds), then the mobile device 100 returns to the standby state shown in FIG. 3 (step 103), and it assumes a standby state where it awaits a calling operation at the mobile device 100 or an incoming call signal from the base station 200, while acquiring the control channel selected by the P channel selection processing in step 102 in FIG. 3.

By means of this configuration, in cases where the base station fails to receive an incoming call response signal from the mobile device and transmits a second incoming call signal to the mobile device, the mobile device can be controlled such that it assumes a state where it can receive this second incoming call signal, thereby resolving the problems associated with conventional devices, namely, situations where the mobile device is not able to receive the second incoming call signal and hence cannot respond thereto.

Figure 5:
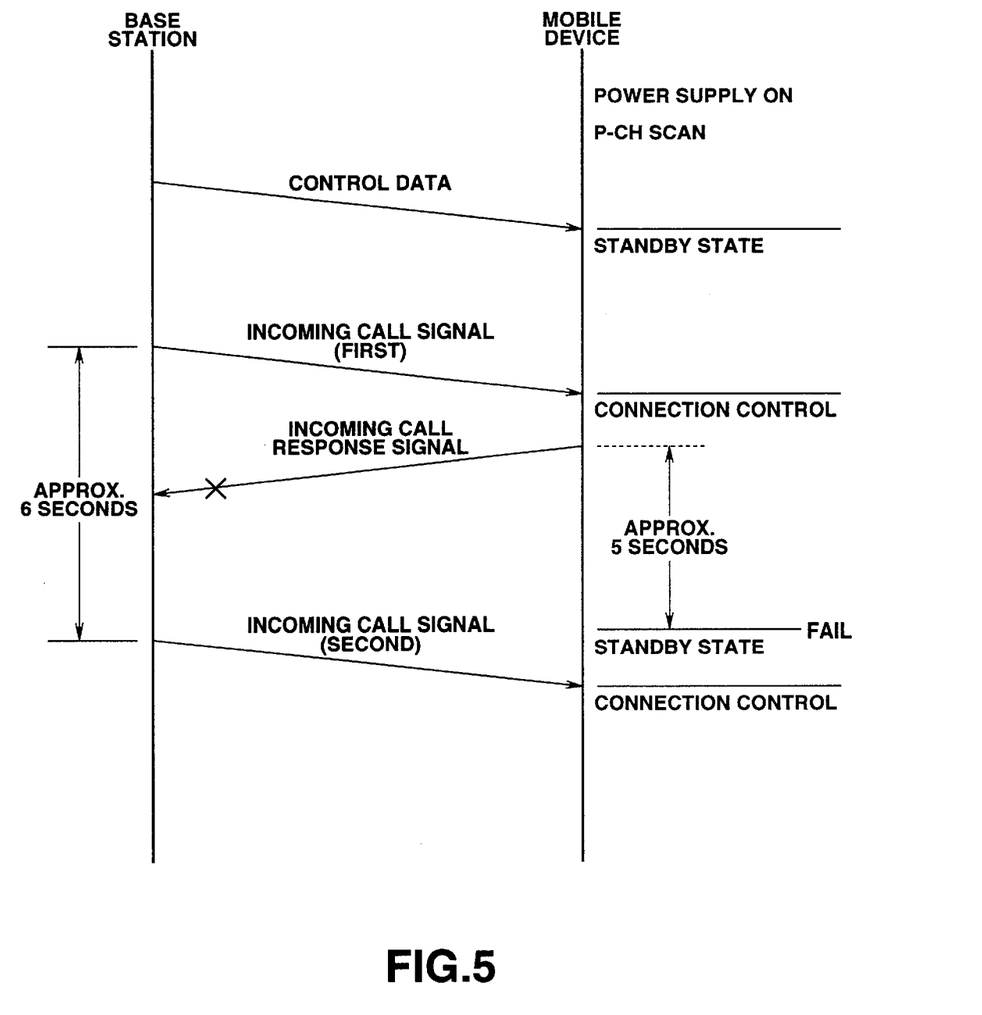
FIG. 5 is a sequence chart illustrating transmission and reception of control signals between a base station and a mobile device in a case where the base station has failed to receive an incoming call response signal from the mobile device illustrated in FIG. 1 and a second incoming call signal is transmitted from the base station to the mobile device.

FIG. 5 is a sequence chart illustrating transmission and reception of control signals between a base station 200 and a mobile device 100 in a case where the base station 200 has failed to receive an incoming call response signal from the mobile device 100 and has transmitted a second incoming call signal to the mobile device 100, in the present embodiment.

In other words, when the power supply is turned on in the mobile device 100 (power supply ON), firstly, it scans the control channels, and selects the control channel having the greatest field strength as a control channel for transmitting and receiving control signals with the base station 200 (P-CH scan).

Upon receiving control data from the base station 100 by means of the selected control channel, the mobile device 100 then assumes a standby state where it awaits a calling operation at the mobile device 100 or an incoming call signal from the base station 200.

When the mobile device 100 receives a (first) incoming call signal from the base station in this standby state, then it enters a connection control state for establishing a communication channel between the mobile device and the base station.

In this connection control process, firstly, an A-CH scan is carried out, and a new control channel is acquired, whereupon the mobile device sends an incoming call response signal to the base station using this new control channel.

Thereupon, if the base station does not receive the incoming call response signal correctly, then this is regarded as an incoming call response signal reception failure at the base station, and the base station then transmits a further (second) incoming call signal to the mobile device approximately 6 seconds after sending the aforementioned (first) incoming call signal.

If the mobile device, on the other hand, has transmitted an incoming call response signal, but has not received a communication channel designation signal from the base station within approximately 5 seconds, then it regards the incoming call response signal transmission as having failed, and it returns to the standby state shown in FIG. 3 (step 103), and assumes a standby state where it awaits a calling operation at the mobile device 100 or an incoming call signal from the base station 200, while acquiring the control channel selected by the P channel selection processing at step 102 in FIG. 3.

Since the mobile device 100 is able to receive the (second) incoming call signal from the base station 200 while in this standby state, it is possible for the mobile device to receive the second incoming call signal from the base station 200, whereby it is possible for the mobile device to transfer swiftly to a connection control state in response to the (second) incoming call signal from the base station 200 thus received.

In the aforementioned embodiment, the reason why the mobile device is constituted in such a manner that it returns to the standby state (step 103) shown in FIG. 3, if it has transmitted an incoming call response signal but there has been a failure in the transmission process of this incoming call response signal, is due to the fact that there is a high probability that it will be able to receive a (second) incoming call signal in this standby state, since it was at least able to receive the (first) incoming call signal from the base station 200 in the previously mentioned standby state.

This invention provides an incoming call control method and device for a mobile communication device, which are improved in such a manner that a swift response to an incoming call is possible even in cases where there has been a failure in a response to an incoming call signal from a base station. By means of this invention, since a configuration is adopted whereby even if a response to an incoming call signal from a base station has failed, the mobile device will return to a standby state prior to reception of an incoming call signal from the base station, without carrying out a scan for a new control channel, it is therefore possible for the mobile device to respond to an incoming call and transfer to connection control swiftly in cases where the base station transmits a second incoming call signal to the mobile device because it has failed to receive an incoming call response signal from the mobile device, and therefore an advantage is obtained in that the mobile device is able to make connections to a base station in a reliable manner.

What is claimed:

1. An incoming call control method for a mobile communication device comprising the steps of:

(a) selecting a control channel by scanning a plurality of control channels;

(b) setting the mobile communication device to a standby state awaiting an incoming call signal to be transmitted from a base station over the selected control channel;

(c) performing an incoming call response procedure for transmitting an incoming response signal to respond to an incoming call signal if the incoming call signal is received from the base station in the standby state;

(d) establishing a communication channel with the base station so that the mobile communication device is in a communicating state if the incoming call response procedure to the incoming call signal from the base station succeeds; and (e) setting the mobile communication device to the standby state awaiting an incoming call signal to be transmitted from the base station over the selected control channel without scanning the channels if the incoming call response procedure to the incoming call signal from the base station fails.

2. The incoming call control method for a mobile communication device according to claim 1, wherein the incoming call response procedure comprises the steps of:

selecting a control channel by scanning the plurality of control channels; performing a synchronization procedure to establish synchronization with the selected control channel;

transmitting an incoming call response signal to the base station over the selected control channel with which synchronization is established in the synchronization procedure;

performing a communication channel designation signal receiving procedure to receive a communication channel designation signal transmitted from the base station in response to the transmission of the incoming call response signal; and capturing a communication channel designated based on the communication channel designation signal if the communication channel designation signal is received in the communication channel designation signal receiving procedure.

3. The incoming call control method for a mobile communication device according to claim 1, wherein if no incoming call signal is received from the base station after a prescribed period of time has elapsed from a start of the standby state in the step (e), the mobile communication device selects a new control channel by rescanning the control channels and sets the mobile communication device to a standby state awaiting an incoming call signal to be transmitted from the base station over the selected new control channel.

4. An incoming call control device for a mobile communication device which selects a control channel by scanning a plurality of control channels, sets the mobile communication device to a standby state awaiting an incoming call signal to be transmitted from a base station over the selected control channel, and if an incoming call signal is received from the base station in the standby state, makes incoming call response to the received incoming call signal, thereby establishing a communication channel with the base station on the basis of a communication channel designation signal transmitted from the base station, comprising:

incoming call responding means for transmitting an incoming call response signal to the base station in response to receiving an incoming call signal from the base station;

incoming call response failure detecting means for detecting that incoming call response fails if no communication channel designation signal is received from the base station after an incoming call response signal is transmitted to the base station by the incoming call responding means; and control means for setting the mobile communication device to a predetermined state corresponding to the standby state without scanning the control channels if the incoming call response failure detecting means detects that the incoming call response fails.

5. The incoming call control device for a mobile communication device according to claim 4, wherein if an incoming call signal is received from the base station in the predetermined state, the incoming call responding means selects a new control channel by rescanning the control channels and transmits an incoming call response signal to the base station over the selected new control channel.

6. The incoming call control device for a mobile communication device according to claim 4, wherein if no incoming call signal is received from the base station after a prescribed period of time has elapsed from a start of a predetermined state, the control means selects a new control channel by rescanning the control channels and sets the mobile communication device to a standby state awaiting an incoming call signal to be transmitted by the base station over the selected new control channel.

7. A mobile communication device which selects a control channel by scanning a plurality of control channels, sets the mobile communication device to a standby state awaiting an incoming call signal to be transmitted from a base station over the selected control channel, and if an incoming call signal is received from the base station in the standby state, makes incoming call response to the received incoming call signal, thereby establishing a communication channel with the base station on the basis of a communication channel designation signal transmitted from the base station, comprising:

incoming call responding means for transmitting an incoming call response signal to the base station in response to receiving an incoming call signal from the base station;

incoming call response failure detecting means for detecting that incoming call response fails if no communication channel designation signal is received from the base station after an incoming call response signal is transmitted to the base station by the incoming call responding means; and control means for setting the mobile communication device to a predetermined state corresponding to the standby state without scanning the control channels if the incoming call response failure detecting means detects that the incoming call response fails.

8. The mobile communication device according to claim 7, wherein if an incoming call signal is received from the base station in the predetermined state, the incoming call responding means selects a new control channel by rescanning the control channels and transmits an incoming call response signal to the base station over the selected new control channel.

9. The mobile communication device according to claim 7, wherein if no incoming call signal is received from the base station after a prescribed period of time has elapsed from a start of the predetermined state, the control means selects a new control channel by rescanning the control channels and sets the mobile communication device to a standby state awaiting an incoming call signal to be transmitted by the base station over the selected new control channel.

10. A mobile communication device comprising:

selecting means for selecting a control channel by scanning a plurality of control channels;

first setting means for setting the mobile communication device to a standby state awaiting an incoming call signal to be transmitted from a base station over the selected control channel;

receiving means for receiving the incoming call signal;

transmitting means for transmitting an incoming call response signal in response to the received incoming call signal;

detecting means for detecting whether a communication channel designation signal is received from the base station for a predetermined time period after the incoming call response signal is transmitted; and second setting means for setting the mobile communication device to a predetermined state corresponding to the standby state awaiting an incoming call signal to be transmitted from the base station over the selected control channel if the communication designation signal is not received for the predetermined time period.

11. The mobile communication device according to claim 10, wherein if the incoming call signal is received from the base station in the predetermined state, the selecting means selects a new control channel by scanning the control channels and transmits the incoming call response signal to the base station over the selected new control channel.

12. The mobile communication device according to claim 10, wherein if the incoming call signal is not received from the base station for a predetermined time period from a start of the predetermined state, the selecting means selects a new control channel by scanning the control channels and sets the mobile communication device to a standby state awaiting an incoming call signal to be transmitted over the selected new control channel.

* * * * *